United States Patent
Lu et al.

(10) Patent No.: US 11,468,174 B2
(45) Date of Patent: Oct. 11, 2022

(54) SURVEILLANCE CAMERA SYSTEM AND RELATED SURVEILLANCE SYSTEM THEREOF

(71) Applicant: eYs3D Microelectronics, Co., Taipei (TW)

(72) Inventors: Chao-Chun Lu, Taipei (TW); Ming-Hua Lin, Taipei (TW)

(73) Assignee: eYs3D Microelectronics Co., Taipei (TW)

( * ) Notice: Subject to any disclaimer, the term of this patent is extended or adjusted under 35 U.S.C. 154(b) by 0 days.

(21) Appl. No.: 15/829,969

(22) Filed: Dec. 3, 2017

(65) Prior Publication Data

US 2019/0050580 A1 Feb. 14, 2019

Related U.S. Application Data

(60) Provisional application No. 62/543,995, filed on Aug. 11, 2017.

(51) Int. Cl.
| | |
|---|---|
| G06F 21/60 | (2013.01) |
| H04N 7/18 | (2006.01) |
| H04N 5/91 | (2006.01) |
| H04N 5/225 | (2006.01) |
| G06F 21/78 | (2013.01) |
| H04N 5/63 | (2006.01) |
| G06F 21/44 | (2013.01) |
| G06F 21/62 | (2013.01) |
| H04N 5/77 | (2006.01) |
| H04N 5/913 | (2006.01) |

(52) U.S. Cl.
CPC .......... *G06F 21/602* (2013.01); *G06F 21/44* (2013.01); *G06F 21/6209* (2013.01); *G06F 21/78* (2013.01); *H04N 5/2257* (2013.01); *H04N 5/63* (2013.01); *H04N 5/77* (2013.01); *H04N 5/91* (2013.01); *H04N 5/913* (2013.01); *H04N 7/185* (2013.01); *G06F 2221/2107* (2013.01); *H04N 2005/91364* (2013.01)

(58) Field of Classification Search
USPC ........................................................ 348/158
See application file for complete search history.

(56) References Cited

U.S. PATENT DOCUMENTS

| | | | | |
|---|---|---|---|---|
| 5,886,739 A * | 3/1999 | Winningstad | .......... | H04N 7/185 348/115 |
| 8,311,275 B1 * | 11/2012 | Berlic | ................ | G06K 9/00771 348/143 |
| 9,183,880 B2 * | 11/2015 | Higuchi | ................ | G11B 27/002 |
| 9,990,777 B2 * | 6/2018 | Bradski | ................. | G06T 19/006 715/808 |
| 2005/0195277 A1 * | 9/2005 | Yamasaki | ............ | G02B 27/017 348/61 |
| 2006/0268114 A1 * | 11/2006 | Chan | .................. | H04N 1/00477 348/207.1 |
| 2011/0128389 A1 * | 6/2011 | Maeda | ............... | H04N 1/00204 348/207.1 |
| 2015/0229813 A1 * | 8/2015 | Isaac-Lowry | ........ | H04N 5/2252 348/376 |

(Continued)

*Primary Examiner* — Behrooz M Senfi

(57) ABSTRACT

A surveillance camera system includes a camera and an image recorder. The image recorder receives a plurality of images captured by the camera and selectively encrypting the plurality of images captured by the camera to generate an encrypted file.

16 Claims, 3 Drawing Sheets

(56) References Cited

U.S. PATENT DOCUMENTS

| | | | | |
|---|---|---|---|---|
| 2016/0116740 A1* | 4/2016 | Takahashi | ............... | G06F 21/32 |
| | | | | 345/8 |
| 2016/0190859 A1* | 6/2016 | Blum | ...................... | H02J 7/025 |
| | | | | 348/372 |
| 2016/0232764 A1* | 8/2016 | Galvin | ............... | H04N 21/6125 |
| 2016/0335802 A1* | 11/2016 | Bradski | ................. | G06T 19/006 |
| 2017/0094189 A1* | 3/2017 | Ogawa | ............. | H04N 5/232935 |
| 2017/0214842 A1* | 7/2017 | Carr | ................... | H04N 5/23203 |
| 2018/0020492 A1* | 1/2018 | Dao | ........................ | H04L 61/20 |
| 2018/0220066 A1* | 8/2018 | Kitamura | ............. | H04N 5/2258 |
| 2020/0092476 A1* | 3/2020 | Yu | ......................... | H04N 5/247 |

* cited by examiner

SURVEILLANCE CAMERA SYSTEM AND RELATED SURVEILLANCE SYSTEM THEREOF

CROSS REFERENCE TO RELATED APPLICATIONS

This application claims the benefit of U.S. Provisional Application No. 62/543,995, filed on Aug. 11, 2017 and entitled "Secured surveillance camera system," the contents of which are incorporated herein by reference.

BACKGROUND OF THE INVENTION

1. Field of the Invention

The present invention relates to a surveillance camera system and a surveillance system, and particularly to a surveillance camera system and a surveillance system that can selectively encrypt images captured by the camera, where the encrypted images can be decrypted and accessed only after an authorization process is approved.

2. Description of the Prior Art

Nowadays, surveillance equipment is widely used in people's daily life, so the surveillance equipment can be used for preventing crime occurrence or confidentiality disclosure.

Sometimes, because images captured by the surveillance equipment are related to confidentiality, only specific persons can view and process the images. That is, the images are strictly prohibited to spread to unauthorized people. However, that the images are strictly prohibited to spread to unauthorized people is not enough because hackers may still invade a storage system coupled to the surveillance equipment to obtain the images. Furthermore, the prior art fails to provide a good solution to prevent the above mentioned condition. Therefore, how to prevent the images captured by the surveillance equipment from being accessed by unauthorized people becomes an important issue.

SUMMARY OF THE INVENTION

An embodiment of the present invention provides a surveillance camera system. The surveillance camera system includes a camera and an image recorder. The image recorder receives a plurality of images captured by the camera and selectively encrypting the plurality of images captured by the camera to generate an encrypted file.

Another embodiment of the present invention provides a surveillance camera system. The surveillance camera system includes a camera, a camera holder, and an image recorder. The camera holder is configured for holding the camera and for coupling the camera to a wearable object. The image recorder is coupled to the camera through the camera holder, wherein when the camera is recognized by the image recorder, a plurality of images captured by the camera are allowed to be transmitted to the image recorder through the camera holder, and the image recorder receives and encrypts the plurality of images captured by the camera to generate an encrypted file.

Another embodiment of the present invention provides a surveillance system. The surveillance system includes a camera module and a computing device. The camera module captures images and selectively encrypts the images to generate an encrypted file. The computing device decrypts the encrypted file after an authorization process is approved by the computing device.

The present invention provides a surveillance camera system and a surveillance system. The surveillance camera system utilizes a process/recording device to encrypt images captured by a camera to generate an encrypted file, and utilizes a storage device protected by a password to store the encrypted file. Then, during an authorization process, the present invention can utilize an image viewer to access and decrypt the encrypted file to generate the images captured by the camera, and to execute an image process on the images captured by the camera. Therefore, compared to the prior art, the present invention can effectively prevent the images captured by the camera from being arbitrarily accessed by other unauthorized people through the surveillance camera system and the image viewer.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
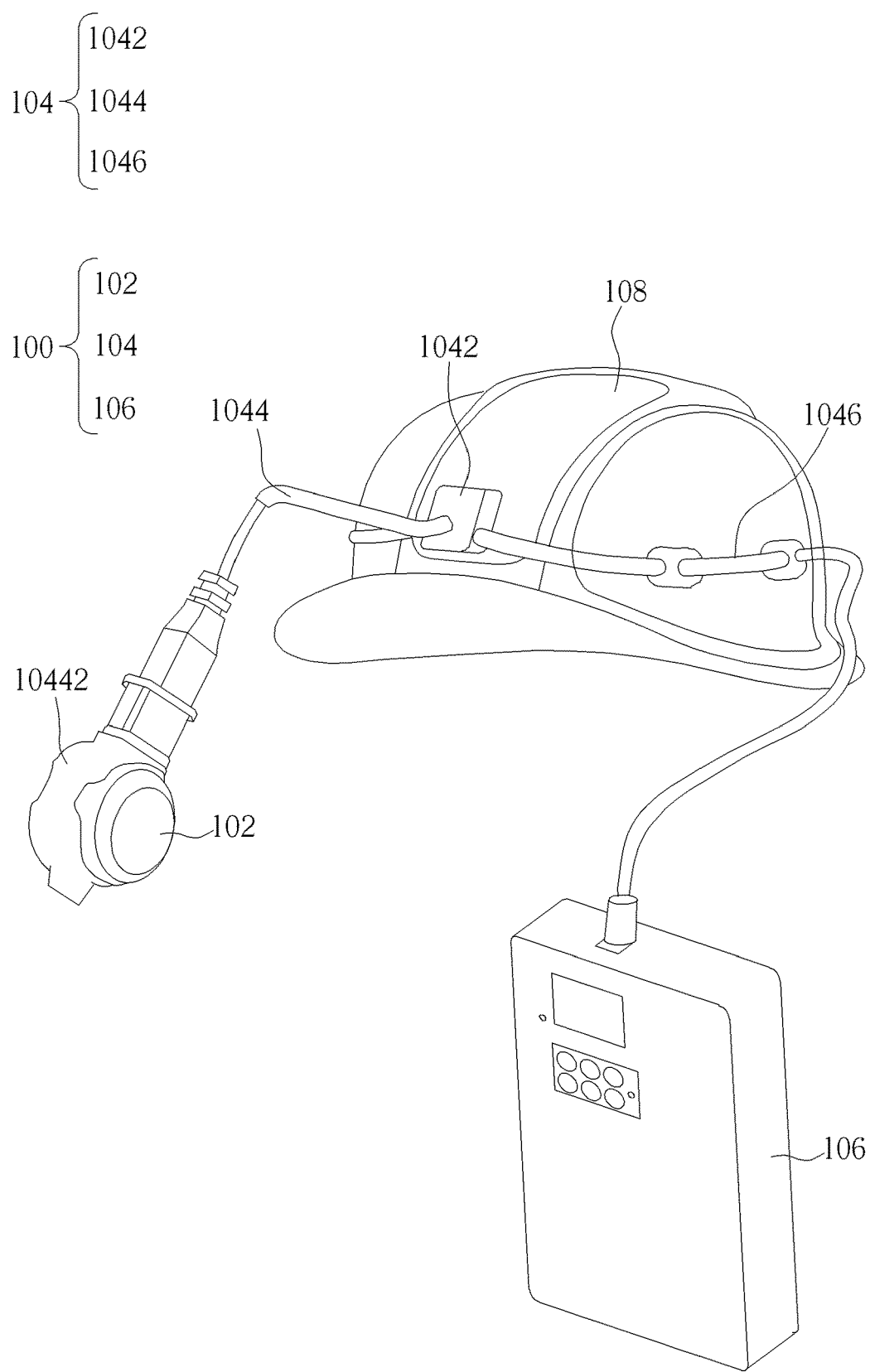
FIG. 1A is a diagram illustrating a surveillance camera system according to an embodiment of the present invention.
Figure 1B:
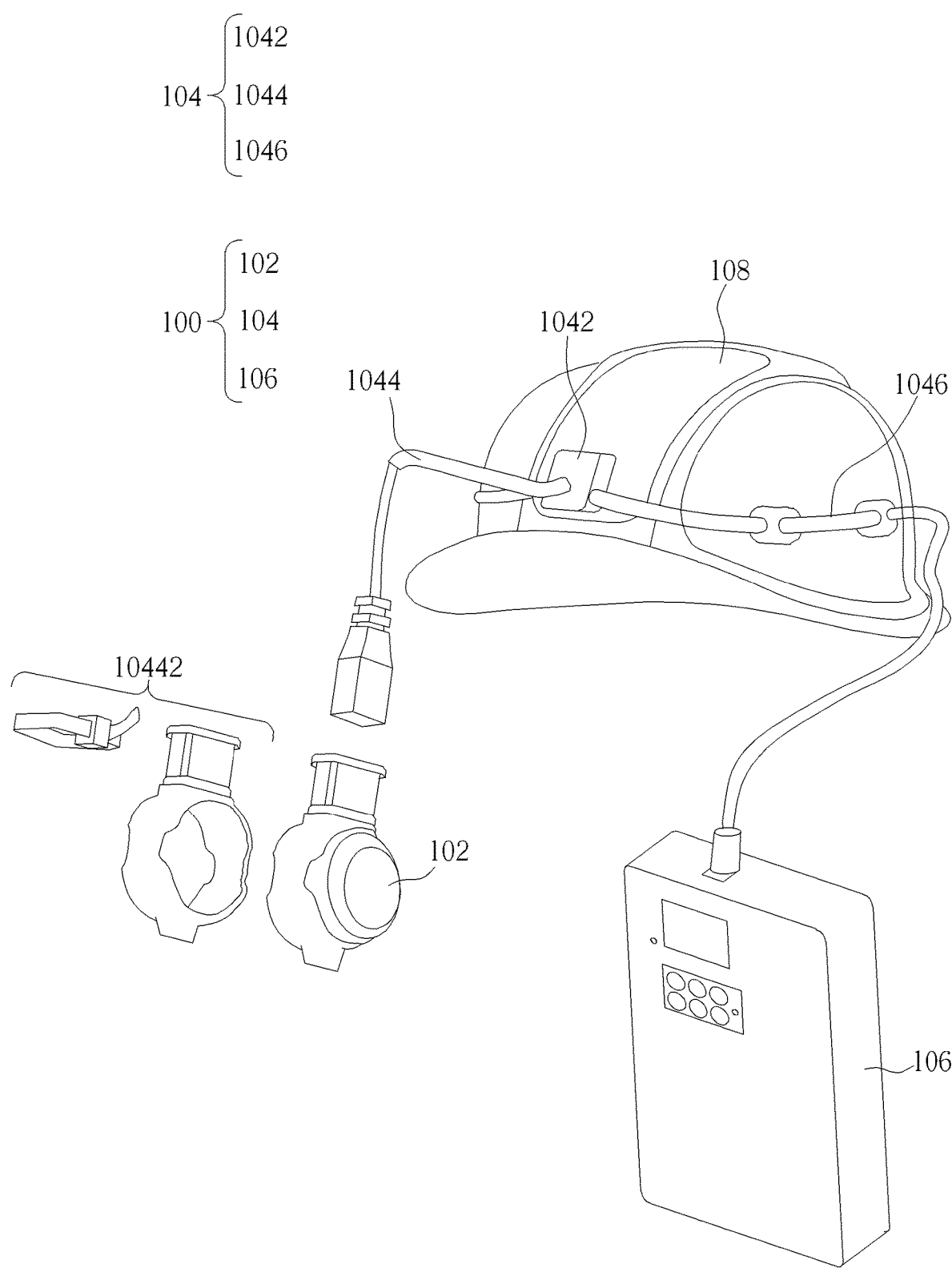
FIG. 1B is a diagram illustrating an exploded view of the fixing component.

Please refer to FIG. 1A. FIG. 1A is a diagram illustrating a surveillance camera system 100 according to an embodiment of the present invention. As shown in FIG. 1A, the surveillance camera system 100 includes a camera 102, a camera holder 104, and an image recorder 106, wherein the camera 102 has an identification serial number and image capturing parameters, and the camera 102 can be a 360° panoramic camera or a stereo camera. As shown in FIG. 1A, the camera holder 104 includes an attachable base 1042, a first cable 1044, and a second cable 1046. In one embodiment of the present invention, the first cable 1044 is a flexible USB cable coupled to the attachable base 1042. The camera 102 has a universal serial bus (USB) 3.x compatible connector (or USB 2.0 connector) coupled to a USB 3.x compatible connector (or USB 2.0 connector) of the first cable 1044, wherein x is 0 or 1. In addition, the USB 3.x compatible connector (or USB 2.0 connector) of the camera 102 and the USB 3.x compatible connector (or USB 2.0 connector) of the first cable 1044 can be USB type A connectors, USB type B connectors, USB mini-A connectors, USB mini-B connectors, USB micro-A connectors, USB micro-B connectors, or USB type C connectors. As shown in FIG. 1A, one end of the first cable 1044 has a fixing component 10442 which can be coupled to the camera 102 and protect (or hold) the camera 102. That is to say, the fixing component 10442 is configured at a periphery of the camera 102 to protect the camera 102. For example, in one embodiment of the present invention, the fixing component 10442 surrounds the camera 102 to protect the camera 102. But, in another embodiment of the present invention, the fixing component 10442 can clamp the camera 102 to protect the camera 102. Therefore, because the first cable 1044 is flexible and the fixing component 10442 can fix the camera 102, a position of the camera 102 can be changed by adjusting a position of the fixing component 10442. As shown in FIG. 1A, the attachable base 1042 could be fixed to a wearable object 108 (e.g. a hat, a helmet, or other wearable equipment by means of glue, sticker, Velcro, or other fixing device (such as screw)). Therefore, when a user (e.g. a worker) wears the wearable object 108 (e.g. the helmet), the user can change the position of the camera 102 as he wants by adjusting the first cable 1044. Furthermore, the second cable 1046 is also a flexible USB cable with a USB 3.x compatible connector (or USB 2.0 connector) coupled to the image recorder 106, wherein the USB 3.x compatible connector (or USB 2.0 connector) of the second cable 1046 can also be a USB type A connector, a USB type B connector, a USB mini-A connector, a USB mini-B connector, a USB micro-A connector, a USB micro-B connector, or a USB type C connector. In one embodiment of the present invention, the first cable 1044 and the second cable 1046 are integrated into but not separable from the attachable base 1042. Of course, in another embodiment of the present invention, the first cable 1044 and the second cable 1046 are separable from the attachable base 1042. In addition, as shown in FIG. 1A, the second cable 1046 is coupled to the attachable base 1042 and configured for being coupled to the image recorder 106. In addition, an exploded view of the fixing component 10442 is shown in FIG. 1B.

Figure 2:
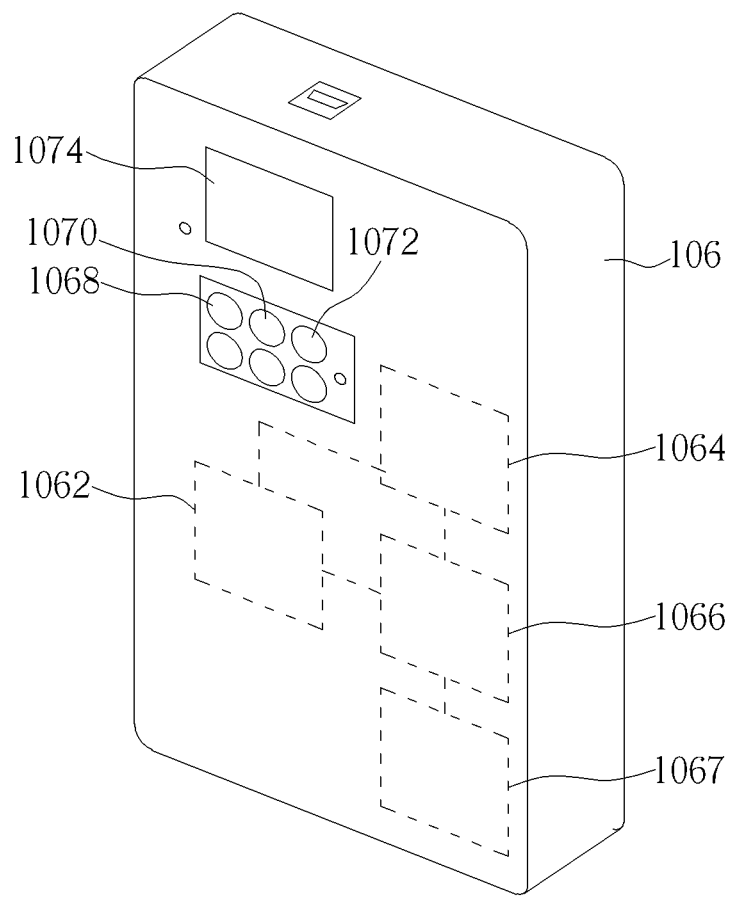
FIG. 2 is a diagram illustrating the image recorder according to an embodiment of the present invention.

Please refer to FIG. 2. FIG. 2 is a diagram illustrating the image recorder 106 according to an embodiment of the present invention. As shown in FIG. 2, the image recorder 106 includes a rechargeable battery 1062, a connecting device 1064, a process/recording device 1066, and a storage device 1067. In one embodiment of the present invention, the image recorder 106 is portable and then could be attached to the user. The rechargeable battery 1062 can optionally offer different power packs, such as 10 hrs, 8 hrs, 5 hrs, or 3 hrs, etc. In addition, the connecting device 1064 can also be a USB 3.x compatible connecting device (or a USB 2.0 connecting device).

In one embodiment of the present invention, the image recorder 106 further includes a plurality of functional indicators. For example, the image recorder 106 has a power-on indicator 1068, a recording indicator 1070, and a status indicator 1072. In addition, other three indicators shown in FIG. 2 are for other functions, so further description thereof is omitted for simplicity. In addition, the present invention is not limited to the image recorder 106 only including six indicators. After the camera 102 is coupled to the first cable 1044 and a power-on button (not shown in FIG. 2) is pressed by the user, the rechargeable battery 1062 can provide electrical power to the camera 102 through the connecting device 1064 and the camera holder 104, and the power-on indicator 1068 is lighted. Meanwhile, the camera 102 can transmit the identification serial number to the process/recording device 1066 of image recorder 106 through the camera holder 104 and the connecting device 1064, and then the process/recording device 1066 starts to recognize (or verify) the camera 102 through the identification serial number. However, in another embodiment of the present invention, after the camera 102 is coupled to the first cable 1044, the rechargeable battery 1062 can automatically provide electrical power to the camera 102 through the connecting device 1064 and the camera holder 104, and the power-on indicator 1068 is lighted, that is, after the camera 102 is coupled to the first cable 1044, the rechargeable battery 1062 can automatically provide electrical power to the camera 102 without the power-on button. Specifically, the process/recording device 1066 can recognize the camera 102 by determining whether the identification serial number of the camera 102 passed to the image recorder 106 matches a stored identification number. If the process/recording device 1066 cannot recognize the camera 102 through the identification serial number (e.g. the process/recording device 1066 determines that the identification serial number fails to match an identification number stored in the process/recording device 1066), the process/recording device 1066 can control the rechargeable battery 1062 to stop providing the electrical power to the camera 102. In another embodiment of the present invention, a display 1074 further included in the image recorder 106 can display a recognition result corresponding to the camera 102 determined by the process/recording device 1066. In another embodiment of the present invention, if the process/recording device 1066 cannot recognize the camera 102 through the identification serial number, the process/recording device 1066 can control the image recorder 106 to be disabled or powered off. In addition, in another embodiment of the present invention, if the process/recording device 1066 cannot recognize the camera 102 through the identification serial number, the process/recording device 1066 can control the image recorder 106 to generate at least one of special light and a special sound effect to notice the user.

On the other hand, the camera 102 is recognized when the camera 102 is coupled to the image recorder 106 and the identification serial number of the camera 102 passed to the image recorder 106 matches the identification number stored in the process/recording device 1066. After the process/recording device 1066 recognizes the camera 102 through the identification serial number, the user can press a recording button (not shown in FIG. 2), and then the recording indicator 1070 is lighted and the camera 102 starts to capture images and the process/recording device 1066 starts to receive the images captured by the camera 102 through the camera holder 104 and the connecting device 1064, wherein in one embodiment of the present invention, the images captured by the camera 102 can be displayed on the display 1074. In addition, the image capturing parameters of the camera 102 are also transmitted to the process/recording device 1066, and the process/recording device 1066 can selectively encrypt the images captured by the camera 102 to generate an encrypted file, and record the encrypted file into the storage device 1067. For example, in one embodiment of the present invention, the process/recording device 1066 can utilize Rivest, Shamir, Adleman (RSA) algorithm, or Advanced Encryption Standard (AES) algorithm to encrypt the images to generate the encrypted file. But, in another embodiment of the present invention, the process/recording device 1066 can also utilize other well-known encryption algorithms to encrypt the images to generate the encrypted file. In addition, in another embodiment of the present invention, the process/recording device 1066 can encrypt the images captured by the camera 102 and the image capturing parameters of the camera 102 to generate the encrypted file, and record the encrypted file into the storage device 1067. In addition, the storage device 1067 can be a removable secure digital memory card (SD card) and the storage device 1067 corresponds to a stored protective password, wherein the stored protective password is used for preventing the storage device 1067 from being accessed illegally. But, the present invention is not limited to the storage device 1067 being a secure digital memory card, that is, the storage device 1067 can be other type memory cards or a compact disc. In addition, the stored protective password is used to decrypt the encrypted file.

In another embodiment of the present invention, the power-on indicator 1068 and the recording indicator 1070 can be integrated into one indicator. Furthermore, the status indicator 1072 can show operational statuses of the image recorder 106, such as whether the encrypted file generated by the process/recording device 1066 are successfully recorded into the storage device 1067, whether the storage space of the storage device 1067 is insufficient, or whether the rechargeable battery 1062 is out of power, etc. In addition, in another embodiment of the present invention, at least one of the power-on indicator 1068, the recording indicator 1070, the status indicator 1072, the power-on button, and the recording button is displayed on the display 1074, wherein when at least one of the power-on button and the power-on button is displayed on the display 1074, the at least one of the power-on button and the power-on button is a touch button.

In addition, in another embodiment of the present invention, the camera holder 104 does not have the second cable 1046, but have a wireless transmission device, so the connecting device 1064 of the image recorder 106 has a wireless transmission function accordingly. Therefore, the camera holder 104 can transmit the images captured by the camera 102 and the image capturing parameters of the camera 102 to the image recorder 106 through a wireless transmission way and the connecting device 1064.

After the process/recording device 1066 records the encrypted file generated by the process/recording device 1066 into the storage device 1067, the encrypted file stored in the storage device 1067 can be decrypted by an authorization process. The authorization process includes: first, the user can input a login password to a computing device (e.g. a personal computer, a notebook, or a portable device) installing a specific software (e.g. an image viewer); second, the image viewer can be enabled when the login password inputted into the computing device matches a stored login password; third, the storage device 1067 can be inserted into the computing device by the user, and then the user needs to input an protective password to the computing device to make the specific software be capable of accessing the storage device 1067; fourth, when the protective password inputted into the computing device matches the stored protective password, the storage device 1067 can be accessed through the specific software; and fifth, after the specific software can access the storage device 1067, the user can utilize the specific software to decrypt the encrypted file stored in the storage device 1067 to generate a decrypted file, wherein the decrypted file includes the images captured by the camera 102. However, in another embodiment of the present invention, when the process/recording device 1066 encrypts the images captured by the camera 102 and the image capturing parameters of the camera 102 to generate the encrypted file, the decrypted file include the images captured by the camera 102 and the image capturing parameters of the camera 102.

After the decrypted file is generated by the authorization process, the user can utilize the specific software to execute an image process (such as dewarping, stitching, etc.) on the images captured by the camera 102 to synthesize 360° panoramic images (if the camera 102 is the 360° panoramic camera) according to the image capturing parameters of the camera 102. In addition, in another embodiment of the present invention, the user can utilize the specific software to execute the image process on the images captured by the camera 102 to synthesize three-dimensional (3D) images (if the camera 102 is the stereo camera) according to the image capturing parameters of the camera 102. Then, the user can also utilize the specific software to view the 360° panoramic images (or the 3D images). Of course, the image recorder 106 can be directly connected to other portable device (e.g. a cellphone, a tablet, etc.), and the user can utilizes the specific software installed in the portable device to access and decrypt the encrypted file stored into the storage device 1067 through the above mentioned authorization process.

In another embodiment of the present invention, the process/recording device 1066 can execute the image process on the images captured by the camera 102 to synthesize the 360° panoramic images (if the camera 102 is the 360° panoramic camera), or to synthesize the 3D images (if the camera 102 is the stereo camera) according to the image capturing parameters of the camera 102. Then, the process/recording device 1066 encrypts the 360° panoramic images (or the 3D images) to generate the encrypted file.

In another embodiment of the present invention, the process/recording device 1066 is included in the camera holder 104, so the image recorder 106 is only used for storing the encrypted file generated by the process/recording device 1066.

In another embodiment of the present invention, the surveillance camera system 100 and the image viewer installed in the computing device can be integrated into a surveillance system.

In addition, in another embodiment of the present invention, when the process/recording device 1066 is included in the camera holder 104, the process/recording device 1066 can provide safety detection (for example, the process/recording device 1066 can detect whether there is any falling object close to the user, whether there is any fire close to the user, etc., through image recognition or detection) and then alert the user by at least one of a special sound effect from a speaker or special light from light-emitting diodes (LEDs), wherein the speaker or the LEDs can be located in camera holder 104 or the image recorder 106.

To sum up, the surveillance camera system utilizes the process/recording device to encrypt the images captured by the camera to generate the encrypted file when the camera is recognized, and utilizes the storage device protected by the stored protective password to store the encrypted file. Then, during the authorization process, the present invention can utilize the image viewer to access and decrypt the encrypted file to generate the images captured by the camera, and to execute the image process on the images captured by the camera. Therefore, compared to the prior art, the present invention can effectively prevent the images captured by the camera from being arbitrarily accessed by other unauthorized people through the surveillance camera system and the image viewer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A surveillance camera system, comprising:
a camera for capturing a plurality of images; and
an image recorder, detachably connected to the camera through a connector, comprising:
a storage device; and
a process/recording device coupled to the storage device, verifying the camera according to an identification serial number transmitted from the camera, wherein when the camera is verified by the process/recording device, the camera is allowed to capture the plurality of images according to a recording instruction, and the process/recording device is allowed to receive the plurality of images and encrypt the plurality of images to generate an encrypted file, and when the camera is not verified by the process/recording device, the process/recording device controls a battery to stop providing electrical power or to be disabled or powered off to make the camera not capture images;

wherein the plurality of images are saved as the encrypted file in the storage device, wherein the camera and the battery are one-to-one connection.

2. The surveillance camera system in claim 1, wherein the camera is verified when the camera is coupled to the image recorder and the identification serial number of the camera passed to the image recorder matches a stored identification number.

3. The surveillance camera system in claim 1, wherein the image recorder is further configured for providing the electrical power to the camera, and when the image recorder fails to verify the camera, the process/recording device controls the image recorder to be disabled or powered off.

4. The surveillance camera system in claim 1, further comprising:

a camera holder holding the camera, the camera holder configured for transmitting the plurality of images to the image recorder and for coupling the camera to a wearable object.

5. The surveillance camera system in claim 4, wherein the camera holder comprises:

an attachable base configured for being fixed to the wearable object;

a first cable coupled to the attachable base, wherein the first cable is configured for being coupled to the camera and for holding the camera; and a second cable coupled to the attachable base and configured for being coupled to the image recorder.

6. The surveillance camera system in claim 5, wherein one end of the first cable has a fixing component, and the fixing component is configured at a periphery of the camera for protecting the camera.

7. The surveillance camera system in claim 1, wherein the image recorder further comprises:

a connecting device configured for coupling to the camera.

8. The surveillance camera system in claim 7, wherein the image recorder further comprises:

the battery, wherein the battery is a rechargeable battery, the rechargeable battery provides the electrical power to the camera, and the rechargeable battery and the process/recording device are in a same case.

9. The surveillance camera system in claim 8, wherein the image recorder further comprises a plurality of indicators for indicating statuses, wherein the statuses correspond to the electrical power provided by the rechargeable battery, image record executed by the process/recording device, and operational statuses of the image recorder.

10. The surveillance camera system in claim 7, wherein the storage device is a removable secure digital memory card, and the removable secure digital memory card corresponds to a stored protective password used to decrypt the encrypted file.

11. A surveillance camera system, comprising:

a camera;

a camera holder configured for holding the camera and for coupling the camera to a wearable object; and an image recorder physically coupled to the camera through the camera holder, comprising:

a storage device; and a process/recording device coupled to the storage device, wherein when the camera is verified by the process/recording device according to an identification serial number transmitted from the camera, the camera is allowed to capture a plurality of images according to a recording instruction, the plurality of images are allowed to be transmitted to the process/recording device through the camera holder, and the process/recording device is allowed to receives and encrypts the plurality of images to generate an encrypted file, and when the camera is not verified by the process/recording device, the process/recording device controls a battery to stop providing electrical power or to be disabled or powered off to make the camera not capture images;

wherein the plurality of images are saved as the encrypted file in the storage device, wherein the camera and the battery are one-to-one connection.

12. A surveillance system, comprising:

a camera module comprising a camera and an image recorder, wherein the camera is allowed to capture a plurality of images when the camera is physically coupled to the image recorder and verified by the image recorder, and the image recorder comprises:

a storage device; and a process/recording device coupled to the storage device, wherein when the camera is verified, the process/recording device receives the plurality of images captured by the camera and encrypts the plurality of images to generate an encrypted file, wherein when the camera is not verified, the process/recording device controls a battery to stop providing electrical power or to be disabled or powered off to make the camera not capture images;

wherein the plurality of images are saved as the encrypted file in the storage device; and a computing device decrypting the encrypted file after an authorization process is approved by the computing device, wherein the camera and the battery are one-to-one connection.

13. The surveillance system of claim 12, wherein the camera module further comprises:

a camera holder configured for holding the camera and for coupling the camera to a wearable object, wherein the image recorder is coupled to the camera holder.

14. The surveillance system of claim 12, wherein the camera is verified when the camera is coupled to the image recorder and an identification serial number of the camera passing to the image recorder matches a stored identification number.

15. The surveillance system of claim 12, wherein the computing device installs an image viewer which accesses and decrypts the encrypted file generated by the camera module when a password inputted into the computing device matches a stored protective password.

16. The surveillance system of claim 12, wherein the computing device is a personal computer, a notebook, or a portable device.

* * * * *